Dec. 15, 1936.     C. C. ABBOTT     2,064,645
ELECTRIC SOLDERING IRON
Filed Nov. 19, 1932
Fig. 1.
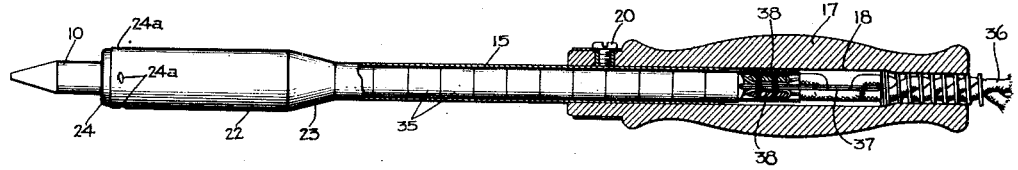
Fig. 2.
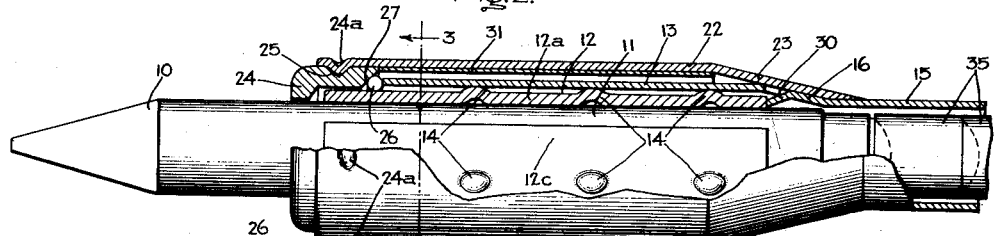
Fig. 3.
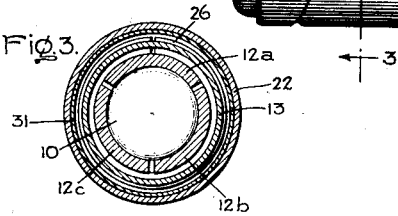
Fig. 5.    Fig. 6.    Fig. 7.
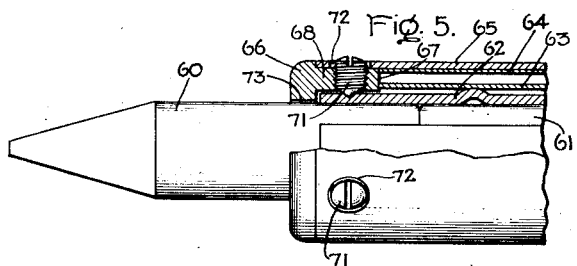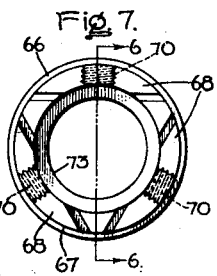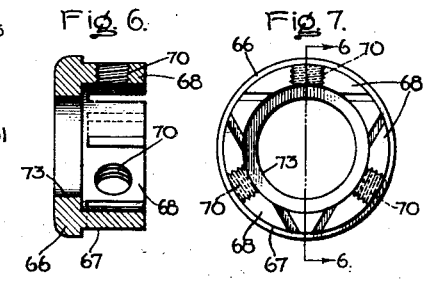
Fig. 4.
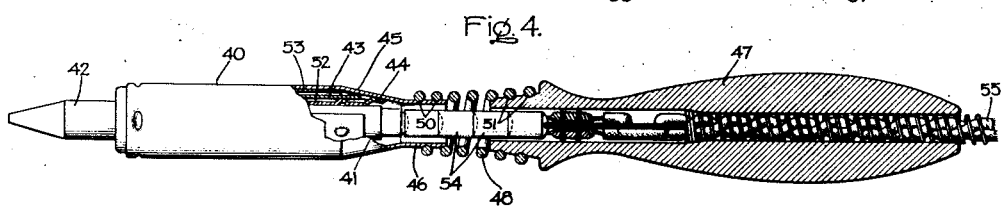
Inventor:
Charles C. Abbott,
by Charles E. Mullen
His Attorney.

Patented Dec. 15, 1936

2,064,645

UNITED STATES PATENT OFFICE 2,064,645

ELECTRIC SOLDERING IRON

Charles C. Abbott, Pittsfield, Mass., assignor to General Electric Company, a corporation of New York Application November 19, 1932, Serial No. 643,388

13 Claims. (Cl. 219—26)

My invention relates to electric soldering irons and has for its object the provision of a simple, reliable and highly efficient device of this character.

In carrying out my invention in one form thereof, I provide a heating element of the sheathed cartridge type comprising a metallic casing in which a resistance heating element is secured. A soldering tip is arranged in abutting coaxial relation with the sheathed heating element. Surrounding both the soldering tip and the heating element is a heat conducting sleeve which preferably will be formed of a metal having a relatively high thermal conductivity, such as commercially pure silver or calorized copper. Surrounding the conducting sleeve in turn is a second sleeve which will be formed of a material having a relatively low heat conductivity, such as a suitable chromium-iron alloy. This second sleeve in one form of my invention functions not only to thermally insulate the heating element and soldering tip, but also serves as a support for these elements, a suitable handle being attached to the sleeve. The portion of the tubular insulating support that surrounds the heat conducting sleeve is provided with an inclosing casing which preferably will be spaced from the tubular member. Within the space between the insulating sleeve and the casing is a suitable heat reflecting member arranged with its reflecting surface directed toward the heating element and tip.

In another form of my invention, the inclosing casing forms the support for the heating element, soldering tip and associated elements, rather than the thermally insulating sleeve that surrounds the heat conducting member. In this case the handle is attached directly to the casing.

For a more complete understanding of my invention, reference should be had to the accompanying drawing in which Fig. 1 is an elevation mainly in section of an electric soldering iron embodying my invention; Fig. 2 is an enlarged fragmentary view of a portion of the soldering iron of Fig. 1, portions being shown in section and portions being broken away so as to illustrate certain structural details; Fig. 3 is a sectional view taken through the line 3—3 of Fig. 2; Fig. 4 is an elevation of an electric soldering iron embodying a modified form of my invention; Fig. 5 is a fragmentary view of an electric soldering iron embodying still another modified form of my invention, portions broken away and portions shown in section so as to illustrate certain structural details; Fig. 6 is a vertical sectional view of a portion of the iron of Fig. 5 and taken through the line 6—6 of Fig. 7; and Fig. 7 is an end view of the member shown in Fig. 6.

Referring to Figs. 1, 2 and 3, in carrying out my invention in one form, I provide a soldering tip 10 which is heated by an electrical heating unit 11 of the sheathed cartridge type.

Directly surrounding the heating element 11 throughout a greater portion of its length and that portion of the soldering tip which is adjacent the heating element is a heat-conducting sleeve 12. Preferably, this sleeve will be formed of a plurality of arcuate shaped sections 12a, 12b, and 12c (Fig. 3) which together substantially surround the heating element and tip. The three elements which make up the heat conducting sleeve 12, as will be pointed out in greater detail hereinafter, are pressed against the surfaces of the tip and heating element so as to effect a very good thermal connection between these members. As shown in Fig 2, the soldering tip 10 abuts against the end of the heating element 11 so as to be arranged as closely to it as possible, the thermal connection between these members being completed by the conducting shoe 12.

In order to increase the efficiency of the iron and to enhance the flow of heat from the heating element 11 to the tip 10 through the heat conducting shoe 12, a suitable casing or sleeve 13 having a relatively low thermal conductivity is arranged about the shoe, preferably in spaced relation with it. As shown in Fig. 2, the members 12a, 12b and 12c which make up the shoe are provided with a plurality of outwardly projecting indentations or protuberances 14 spaced at intervals longitudinally and circumferentially of the shoe, these indentations forming supports for the tubular member 13. These supports hold the heat shield 13 in spaced relation with the shoe 12. This member 13 preferably will be substantially coextensive with the shoe 12.

As previously pointed out, the member 13 will have a relatively poor thermal conductivity. Any suitable material having a fairly strong and rigid construction and having a low thermal conductivity may be used. I prefer to form the shield 13 of a suitable metal, such as chromium-iron alloy having a chromium content of approximately 12-16%.

The tubular member 13 in the form of my invention shown in Figs. 1, 2 and 3 constitutes a support for the heating element and soldering tip and their associated parts. As shown, the end of the sleeve portion 13 remote from the soldering tip merges into a tubular portion 15 of reduced diameter, the portions 13 and 15 being interconnected by a frusto-conical shaped member 16. It is preferable to form the members 13, 15 and 16 out of a single piece of material, as clearly shown in Fig. 2.

Near the end of the tubular member 15 remote from the soldering tip is a suitable handle member 17 which, as shown, is provided with a centrally arranged bore 18 that receives the end portion of the tubular member 15. The handle 17 may be secured to the tubular member in any suitable manner. For this purpose, I have shown a suitable set screw 20 in the handle member and engaging the tubular member 15.

The indentations 14 provided in the heat conducting shoe 12 are so proportioned that the shoe when assembled with the heating unit and soldering tip has a sliding fit with the tubular member 13.

Surrounding the insulating sleeve 13 and in spaced relation with it is a suitable casing 22 which is substantially coextensive with the conducting sleeve 12 and its surrounding heat insulating sleeve 13. The casing 22, as shown, at its right hand, as viewed in the figure, is provided with a frusto-conical portion 23 which bears against the conical portion 16 of the support 13, 15. This conical portion 23, it will be observed, merges into the tubular portion 15 substantially at the juncture point between this portion and the conical portion 16 of the support. This casing also will be formed of a material having a relatively low heat conductivity and may be made of the same material that the sleeve 13 is made of. Thus, the casing may be made of a chromium-iron alloy having a chromium content of approximately 12-16%.

The inclosing member 22 is rigidly locked in its assembled relation with the tubular supporting member 13, 15 by means of a suitable nut-like head 24. This head also functions to firmly force the heat conducting members 12a, 12b and 12c into good mechanical and thermal relation with the soldering tip 10 and the heating element 11.

As shown, the casing 22 at its end adjacent the soldering tip 10 is provided with a number of indents 24a which are arranged in a spiral manner so as to form a broken thread which is arranged to receive the continuous thread 25 formed in the nut 24. This broken thread arrangement in the casing 22 possesses the advantage that the head is less likely to stick in the casing than would be the case if the thread were made continuous.

The nut 24, as shown, is provided with a centrally arranged aperture so that the nut can be threaded over the tip 10.

Interposed between the inner end of the head 24 and the adjacent end of the sleeve 13 is a slit or broken ring 26 surrounding the shoes 12a, 12b and 12c. The head 24 at its inner end is provided with an inclined surface 27 bearing against the broken ring 26 so that when the head 24 is screwed inwardly of the casing 22, the inclined surface will exert a pressure on the ring so as to contract it and force it firmly against the heat conducting shoes. These shoes in turn are forced into very good thermal and mechanical engagement with the soldering tip and heating element.

At the same time that the head 24 is being forced inwardly of the casing it will draw the conical portion 23 of the casing 22 tightly against the conical portion 16 of the supporting tubular member, the taper on the casing cooperating with the taper on the supporting member to resist the action of the head in being screwed into the casing. This arrangement provides a rigid and mechanically strong assembly of parts.

Preferably, the aperture provided in the head 24 for receiving the soldering tip 10 will have a diameter somewhat larger than the diameter of the tip so as to provide a clearance space between these members, as clearly shown in Fig. 2. This clearance serves to thermally insulate the head and casing 22 from the tip 10. In this connection it will be observed that the ring member 26 has but line contact with the head 24 and also with the heat conducting sleeve 12 which of course provides a minimum bearing area between the ring and these members through which heat may be conducted from the heat conducting sleeve to the casing 22 and head 24.

Preferably, suitable indents or other suitable abutments 30 will be provided on the conical portions 16 of the supporting member 13, 15 against which the ends of the shoes 12a, 12b and 12c rest. These abutments 30 automatically position the conducting sleeve 12 relative to the supporting tube 13. Preferably, the members 30 will be formed by striking them inwardly from the metal forming the support.

It will be observed that the soldering tip 10 is in very good thermal relation with the heating element 11 by reason of the arrangement of the heat conducting shoes 12a, 12b and 12c the forming of the sleeve 12 substantially surrounding these members and joining them thermally. It will also be observed that the heat conducting shoes have a very small area of contact with the surrounding heat shield 13 and likewise, that they have a very small area of contact with the ring 26 which in turn contacts the nut 24 of the casing 22. The heat shield on one end merely engages the relatively small abutments 30 while its other end has but line contact with the ring 26. This arrangement of the elements is conducive to a very high thermal efficiency of the device because very little heat escapes to the casing and support from the heating element and the soldering tip. The loss of heat is reduced, of course, by the heat shield 13 which completely surrounds the heating element. Practically all of the heat generated in the unit 11 flows directly to the abutting tip 10 or to the tip through the heat conducting shoe 12.

However, in order to practically preclude any possibility of loss of heat through the casing 22, I interpose between the casing and the tubular heat shield 13 a heat reflecting member 31 formed of some suitable material, such as chromium. This member 31, as shown (Figs. 2 and 3), is of tubular form and has a rather close fit with the inner walls of the surrounding casing 22. The casing 22 is sufficiently large to provide a substantial space between the heat reflecting member 21 and the outer walls of the tubular heat shield 13. It will be understood that the inner surface of the member 31 facing the tubular member 13 is highly polished. In the event that any of the heat generated by the element 11 is dissipated through the shield 13 it will be intercepted by the reflecting plate 31 and directed back toward the heating element and tip.

One end of the heat reflecting member 31, it will be observed, rests against the conical wall 23 of the casing, while its other end bears against the head 24. It will be understood that the length of the reflector 31 will be such that when the reflector is assembled it will be securely locked in place between the nut and conical wall 23.

The element 11 may have any suitable construction, but preferably will be of the cartridge sheathed type, such as described and claimed in my United States Patent No. 1,708,961, dated April 16, 1929. It is believed to be unnecessary to describe in detail in this application the specific construction of this heating unit because it forms no part of my present invention.

It will be understood, however, that this heating element 11 is provided with suitable terminals (not shown) which project from the end of the sheath remote from the soldering tip 10, that is, from that end which is adjacent the handle 17.

These terminals extend through the tubular member 15 to the handle 17 and are threaded through cylindrical insulators 35 positioned in the tube 15 and which will be formed of any suitable electrically insulating material, such as porcelain. Each of these insulators is provided with two parallel holes which receive the two terminals.

The heating element terminals and the insulators 35 threaded on them are arranged in substantially identically the same fashion as are the heating element terminals and terminal insulators disclosed in my United States Patent No. 1,708,995, dated April 16, 1929, of which my above-mentioned United States patent is a division. As described in this Patent No. 1,708,995, the insulators 35 form electrically insulating passageways for the terminal members between the heating element 11 and the handle 17 where the terminals are electrically connected with the two conductors of a suitable twin-supply conductor 36. As shown, these conductors extend into the bore 18 provided centrally of the handle 17 where they are threaded through a suitable electrically insulating retaining strip 37 secured in the handle. The ends of the supply conductor are twisted together with the ends of the terminals to form twisted joints 38. This connection between the supply conductor 36 and the terminals of the electrical heater and the construction and arrangement of retaining strip 37 are described and claimed in my above-mentioned United States Patent No. 1,708,995 and form no part of my present invention.

In Fig. 4 is shown a modified form of my invention wherein the handle rather than being secured to the heat insulating sleeve 13 is secured to the inclosing casing 40 for the heating element 41 and associated tip 42. As shown in Fig. 4, the tubular heat shield 43 does not merge into a portion of reduced diameter as does the heat shield 13 of Figs. 1 and 2 merge into the tubular member 15, but is broken away substantially at the end of its frusto-conical portion 44. And moreover, that the frusto-conical portion 45 of the inclosing casing 40 rather than being broken-off, as shown in Figs. 1 and 2, merges in a tubular portion 46 of somewhat reduced diameter. This portion 46 of the inclosing casing is connected to the handle 47 by means of a helically-shaped member 48, similar to the helical member 32 shown in my Patent No. 1,708,995 above referred to. As shown, threads 50 and 51 are provided in the casing 46 and the handle 47 respectively to receive one or more end turns of the spring member 48. This member 48 is made of spring steel or other suitable resilient material so that the end turns expand slightly when screwed on the casing and the handle. If desired, the portion 46 of the casing may be extended to and connected with the handle 47 as is the tube 15 of Figs. 1 and 2 extended and connected with the handle 17.

Otherwise, the soldering iron of Fig. 4 is constructed in substantially identically the same fashion as is the iron of Figs. 1, 2 and 3. The soldering tip and the heating element are arranged in abutting relation and coaxial of each other, and these members are surrounded by a heat conducting shoe 52 which in turn is surrounded by the heat shield 43 arranged in spaced relation with the shoe. These members are in turn surrounded by the inclosing casing 40 which is provided on its inner wall with a heat reflecting body 53, all these members being arranged as are the corresponding parts of Figs. 1, 2 and 3. The terminals of the heating element are threaded through insulation 54 and are received in the handle 47 where they are connected with the conductors of a twin-supply conductor 55 all in substantially the same fashion as are the corresponding parts of Figs. 1, 2 and 3.

In Figs. 5, 6 and 7, I have shown still another form of my invention. In this form, the soldering tip 60, its heating element 61, the heat conducting shoes 62 thermally uniting the soldering tip and heating element, the heat shield 63, the heat reflecting member 64 and the casing 65 all are arranged in substantially the same manner as are the corresponding parts shown in Fig. 4.

The difference in this form resides in the means for retaining the parts in their assembled positions and for forcing the shoes 62 into thermal relation with the tip 60 and the heating element 61. In this form, a head 66 is provided to perform these functions. This head, as shown, is provided with a sleeve 67 divided into a plurality of separated sections 68. This sleeve, as shown in Fig. 5, is received in the end of the casing 65 so as to abut the adjacent ends of the sleeves 63 and 64 and so as to surround the adjacent ends of the shoes 62. Each of the sections is provided with a threaded aperture 70 which receives a stud 71 arranged to bear against the shoes 62. When these studs are screwed inwardly into contact with the shoes they will force the shoes into engagement with the tip 60 and heating element 61 and at the same time will force the members 68 outwardly against the casing 65 thereby holding the elements firmly in place. The casing is provided with apertures 72 through which the studs 71 are passed.

The head 66 is provided with an aperture 73 for receiving the tip 60. Preferably, the aperture 73 will be somewhat larger in diameter than the tip so as to leave a small clearance between these members. It is also preferable that the inner diameter of the sleeve 68 be somewhat larger than is the outside diameter of the shoes 62 so that when assembled there will be no possibility of the sleeve contacting the shoes.

It will be observed that I have provided a soldering iron wherein practically all of the heat generated flows to the working tip where it is utilized. The heating element is thermally connected with the working tip by means of conducting shoes which in turn are surrounded by a heat insulating shield. The heat-conducting shoes have an extremely small area of contact with the inclosing casing through which heat loss may occur. Hence it is quite unlikely that any heat will be dissipated by conduction from the shoes to the inclosing casing. The conducting shoes moreover have a very small area of contact with the surrounding heat shield and the shield in turn has very small area of contact with the casing. Hence there can be little loss of heat by these members.

As an additional precaution, applicant has provided the heat reflecting member 31 (Figs. 1 and 2), 53 (Fig. 4), 64 (Fig. 5), for intercepting any heat that might escape through the shield surrounding the heat conducting member and reflecting it back toward the heating element and working tip.

The working tip itself does not contact with any part of the structure other than the heating element and the heat conducting shoe forming a thermal path between the heating element and the tip.

I have found that my heating element has a very high efficiency so that for a given application the heat generating capacity of the heating element may be smaller, or in other words, for a given sized heating element more heat is utilized.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A soldering iron comprising a soldering tip, a heating unit arranged axially of said tip, a metallic sleeve formed of a material having a relatively high heat conductivity surrounding portions of said heating element and said soldering tip so as to unite said members in thermal relation, a second sleeve formed of a metal having a relatively low heat conductivity surrounding said heat conducting sleeve in spaced relation with it, but having limited mechanical contact therewith to support said heat conducting sleeve, heating element and tip, a handle secured to said second sleeve and a sleeve surrounding said second sleeve in spaced relation with it and having an inner highly polished heat reflecting surface facing said second sleeve.

2. An electrically heated soldering iron comprising an electrical heating element, a soldering tip in axial alignment with said heating element, a metallic sleeve having a relatively high thermal conductivity surrounding said heating element and a portion of said tip thermally uniting said members, said sleeve consisting of a plurality of arcuate-shaped sections slightly spaced apart, and means engaging said sleeve sections so as to press them into good thermal and mechanical engagement with said tip and said heating element.

3. An electrical soldering iron comprising a soldering tip, an electrical heating element in axial alignment with said tip, a metallic sleeve having a relatively high thermal conductivity surrounding portions of said tip and said heating element so as to thermally and mechanically unite said members, a heat reflecting sleeve surrounding said metallic sleeve in spaced relation with it so as to provide an annular space between said members, a metallic sleeve having a relatively low heat conductivity mounted in the space between said heat reflecting sleeve and said heat conducting sleeve, means mounting said sleeve of low heat conductivity in spaced relation with said heat conducting sleeve and said heat reflecting sleeve, but mechanically connected with said sleeves to support both of them and a handle secured to said sleeve of low heat conductivity.

4. A soldering iron comprising a soldering tip, a heating element in axial alignment with said tip, a metallic sleeve having a relatively high heat conductivity surrounding portions of said heating element and said soldering tip so as to unite said members in thermal relation, a second metallic sleeve having a relatively low heat conductivity surrounding said heat conducting sleeve and constituting a support for said heating element and tip, said heat conducting sleeve being provided with outwardly projecting protuberances arranged to support said second sleeve in spaced relation with it and a handle attached to said second sleeve.

5. A soldering iron comprising a heating element, a soldering tip in axial alignment with said heating element, a sleeve having a relatively high thermal conductivity surrounding portions of said heating element and said tip in good thermal relation with said members so as to thermally and mechanically connect said members, a support for said tip, heating element and sleeve comprising a tubular member formed of a material having a relatively low heat conductivity surrounding said sleeve substantially co-extensive therewith and mechanically engaging it to support it, a handle attached to said tubular member, a sleeve surrounding said tubular member and provided with a heat reflecting surface facing said tubular member and substantially co-extensive therewith and a casing covering said reflecting sleeve and supported by said tubular member.

6. A soldering iron comprising a soldering tip, a sheathed heating element in axial alignment with said tip, a heat conducting sleeve embracing said tip and heating element in good thermal relation therewith, a supporting sleeve surrounding said heat conducting sleeve provided with a tapered portion and an abutment in said tapering portion against which one end of said conducting sleeve bears, a casing for said sleeves provided at one end with a tapered portion fitted to the taper in said supporting sleeve and its opposite end provided with a screw thread, and a retaining head threaded in said screw thread bearing against the adjacent end of said supporting sleeve so as to draw the tapered portions of casing and sleeve tightly together and hold said members rigidly in place.

7. A soldering iron comprising a soldering tip, a heating unit in axial alignment with said tip, a metallic sleeve having a relatively high thermal conductivity in thermal relation with said tip and said heating unit, a supporting member provided with a tubular portion having a relatively low thermal conductivity surrounding said conducting sleeve and with a second tubular portion of reduced diameter extending axially from said first tubular portion, the portion of said support connecting said tubular portions being provided with abutments against which one end of said heat conducting sleeve rests, and said conducting sleeve being provided with outwardly projecting protuberances upon which said first tubular portion rests in spaced relation with said sleeve, a casing surrounding said first tubular portion in spaced relation with said portion and provided with a reduced portion fitted to the portion of said supporting member connecting said first and second tubular portions of said member, a broken ring member on the soldering tip end of said conducting sleeve and a nut-like head threaded into the end of said casing at the soldering tip end thereof bearing against the adjacent end of said supporting sleeve and on said ring member so as to rigidly hold said members in assembled relation and so as to force said ring member into engagement with the heat conducting sleeve surrounding said heating element and soldering tip.

8. A soldering iron comprising an elongated tubular member formed of a material having a relatively low heat conductivity, a handle attached to one end of said tubular member whereby the iron may be manipulated, a heating unit in said tubular member spaced from its walls, a soldering tip in the outer end of said member projecting therefrom and likewise spaced from its walls, a sleeve formed of a material having a relatively high heat conductivity mounted within the space between said heating element and soldering tip and said tubular member and spaced from the tubular member, means mechanically associating said tubular member with said sleeve to mechanically support said sleeve by said tubular member, a casing supported by said tubular member surrounding said member in spaced relation with it, and a heat reflecting member within said casing spaced from said tubular member.

9. A soldering iron comprising a soldering tip, a heating element coaxial with said tip, heat conducting shoes arranged about portions of said tip and heating element so as to substantially surround said portions, a broken ring surrounding said shoes, and means engaging said broken ring so as to contract said ring on said shoes to force said shoes into good thermal and mechanical relation with said portions of soldering tip and said heating element.

10. A soldering iron comprising a soldering tip, a heating element coaxial with said soldering tip, heat conducting shoes surrounding said heating element and a portion of said soldering tip so as to firmly unite said members, a thermally insulating shield surrounding said heat conducting shoes in spaced relation therewith, said conducting shoes having a plurality of outwardly projecting protuberances upon which said insulating sleeve rests, a casing inclosing said shield, said heat conducting shoes and said heating element, and a handle attached to said casing.

11. A soldering iron comprising a soldering tip, a heating element coaxial with said soldering tip, a heat conducting sleeve surrounding said heating element and a portion of said soldering tip so as to thermally unite said members, a thermally insulating shield surrounding said heat conducting sleeve in spaced relation therewith, said conducting sleeve having a plurality of outwardly projecting protuberances upon which said insulating sleeve rests, a casing inclosing said shield, said heat conducting sleeve and said heating element, and a handle attached to said casing.

12. A soldering iron comprising a soldering tip, a heating element aligned with said tip, a heat conducting sleeve surrounding portions of said heating element and tip so as to thermally unite said members, a clamping member for said sleeve engaging it at its tip end, a casing surrounding said heat conducting sleeve in spaced relation with it, a handle secured to said casing, a sleeve within said casing surrounding said heat conducting sleeve and having its tip end engaging said clamping member and its opposite end engaging said casing whereby it is secured within said casing, and abutments on said second sleeve engaging the end of said heat conducting sleeve opposite said tip to secure said end within said sleeve.

13. A soldering iron comprising a soldering tip, a heating element aligned with said tip, heat conducting shoes surrounding portions of said heating element and tip so as to thermally unite said members, a clamping member at one end of said shoes forcing them into engagement with said tip and heating element, a casing surrounding said conducting shoes in spaced relation with them, means securing one end of said casing to said clamping member, the opposite end of said casing having a portion tapering to a smaller diameter and an elongated portion of smaller diameter extending from said tapered portion, a handle secured to said elongated portion and a sleeve of relatively low heat conductivity in said casing surrounding said heat conducting shoes having one end resting against said clamping member and its opposite end against said tapered portion and also having abutments engaging the ends of said heat conducting shoes opposite said clamping member.

CHARLES C. ABBOTT.